(12) United States Patent
Duan et al.

(10) Patent No.: US 12,442,482 B2
(45) Date of Patent: Oct. 14, 2025

(54) QUICK CONNECTION STRUCTURE

(71) Applicant: ZHONGSHAN DASHAN PHOTOGRAPHIC EQUIPMENT CO., LTD., Zhongshan (CN)

(72) Inventors: Jinhua Duan, Zhongshan (CN); Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 327 days.

(21) Appl. No.: 17/948,238

(22) Filed: Sep. 20, 2022

(65) Prior Publication Data
US 2023/0417359 A1    Dec. 28, 2023

(30) Foreign Application Priority Data

| Jun. 27, 2022 | (CN) | ......................... 202210738501.4 |
| Jun. 27, 2022 | (CN) | ......................... 202210738502.9 |
| Sep. 5, 2022 | (CN) | ......................... 202211080680.3 |
| Sep. 5, 2022 | (CN) | ......................... 202211095636.X |

(51) Int. Cl.
*F16M 11/04* (2006.01)
*F16M 11/12* (2006.01)
*G03B 17/56* (2021.01)

(52) U.S. Cl.
CPC ......... *F16M 11/041* (2013.01); *F16M 11/126* (2013.01); *G03B 17/561* (2013.01)

(58) Field of Classification Search
CPC ...... F16M 11/041; G03B 17/561; F16B 21/16
See application file for complete search history.

(56) References Cited

U.S. PATENT DOCUMENTS

| 2,448,817 A | 9/1948 | Mcarthur |
| 2,942,897 A | 6/1960 | Eason |
| 3,184,196 A * | 5/1965 | Dent .................... F16M 11/041 |
| | | 403/381 |

(Continued)

FOREIGN PATENT DOCUMENTS

WO    2006028528 A2    3/2006

OTHER PUBLICATIONS

European Search Report issued in EP application No. 22196632.8, mailed May 31, 2023.

*Primary Examiner* — Bradley Duckworth

(57) ABSTRACT

A quick connection structure includes a first component, a second component, a locking component and a first reset component. The second component includes a mounting portion defining a mounting groove, a first locking portion, a second locking portion and an unlocking portion. The locking component is movably connected to the mounting portion. The first reset component is arranged between the locking component and the mounting portion. The locking component drives the first locking portion to a locking position during the movement thereof to a first position and enables the first locking portion to an unlocking position when moving to a second position. The first locking portion at the locking position locks the first component, and at the unlocking position unlocks the first component. The second locking portion locks the locking component at the second position, and the unlocking portion drives the second locking portion to unlock the locking component.

20 Claims, 14 Drawing Sheets

(56) References Cited

U.S. PATENT DOCUMENTS

| | | | | |
|---|---|---|---|---|
| 5,333,023 | A * | 7/1994 | Oxford | F16M 13/00 396/428 |
| 6,234,690 | B1 * | 5/2001 | Lemieux | F16M 13/00 396/419 |
| 7,959,123 | B1 * | 6/2011 | Kitscha | F16M 11/32 248/188 |
| 9,726,963 | B1 | 8/2017 | Xiao | |
| 11,150,540 | B2 * | 10/2021 | Zhu | F16B 7/1409 |
| 2007/0194173 | A1 * | 8/2007 | Paasche | B60N 2/3043 244/118.5 |

* cited by examiner

QUICK CONNECTION STRUCTURE

CROSS-REFERENCE TO RELATED APPLICATIONS

This application claims priorities to Chinese Patent Application No. 202210738501.4, filed on Jun. 27, 2022, Chinese Patent Application No. 202210738502.9, filed on Jun. 27, 2022, Chinese Patent Application No. 202211080680.3, filed on Sep. 5, 2022 and Chinese Patent Application No. 202211095636.X, filed on Sep. 5, 2022, each of which is incorporated herein by reference in its entirety.

TECHNICAL FIELD

The present application relates to the technical field of photographic auxiliary equipment, and in particular to a quick connection structure.

BACKGROUND

Quick connection structure is a kind of photographic auxiliary equipment that is mounted onto a tripod through a Pan-Tilt. Generally, the quick connection structure is connected to the Pan-Tilt by snap-fitting, and a camera is fixed onto the quick connection structure by screwing, which can realize quick connection of the camera to the tripod. However, the quick connection structure in the related art is complex in construction, and is inconvenient to assemble or disassemble.

SUMMARY

Regarding the abovementioned potential technical problems in the related art, an object of the present application is to provide a quick connection structure which is convenient to assemble or disassemble.

To achieve the above purpose, an embodiment of the present application provides a panel lock including:
 a first component;
 a second component including a mounting portion, a first locking portion, a second locking portion and an unlocking portion, the mounting portion defining a mounting groove for mounting the first component therein;
 a locking component being movably connected to the mounting portion, the locking component being capable of moving relative to the mounting portion to a first position or a second position; and
 a first reset component being arranged between the locking component and the mounting portion, for generating a force to drive the locking component to move to the first position;
 wherein the locking component drives the first locking portion to a locking position during the movement thereof to the first position and enables the first locking portion to return to an unlocking position when moving to the second position;
 wherein the first locking portion at the locking position is capable of locking the first component which is inserted into the mounting groove, and the first locking portion at the unlocking position is capable of unlocking the first component in the mounting groove; and
 wherein the second locking portion is configured for locking the locking component at the second position; and the unlocking portion is configured for driving the second locking portion to unlock the locking component after obtaining a driving force to which is given during the inserting of the first component into the mounting groove.

In some embodiments, the mounting portion includes an annular wall arranged around the central axis, the mounting groove is defined in the annular wall, a first mounting hole is defined in the annular wall, and the first mounting hole extends radially through the annular wall and communicates with the mounting groove; the first locking portion is movably mounted in the first mounting hole, moving along a direction towards the central axis to extend into the mounting groove, thereby reaching the locking position; or, moving along a direction away from the central axis to withdraw from the mounting groove, thereby reaching the unlocking position.

In some embodiments, further includes a second reset component, the second reset component being arranged between the mounting portion and the first locking portion, for generating a force to drive the first locking portion to move to the unlocking position.

In some embodiments, the locking component is annular and mounted around the annular wall, the first reset component is arranged between the locking component and the annular wall, one end of the spring away from an entrance of the mounting groove abuts against the annular wall, and the other end of the spring near the entrance abuts against the locking component.

In some embodiments, a second mounting hole is defined in the annular wall, and the second locking portion is movably mounted in the second mounting hole, the second locking portion being capable of sliding radially to extend out of the annular wall to lock the locking component at the second position or towards the central axis to a position to unlock the locking component.

In some embodiments, further includes a third reset component, the third reset component being mounted in the second mounting hole for generating a force to make the second locking portion extend out of the annular wall to lock the locking component at the second position; the second locking portion being pushed to slide towards the central axis during the movement of the locking component to the second position, the third reset component driving the second locking portion to slide away from the central axis after the locking component moving to the second position, thereby making the second locking portion lock the locking component.

In some embodiments, the unlocking component is arranged at an end of the mounting groove away from the entrance, for pushing the second locking portion to move towards the central axis when the unlocking component moves away from the entrance.

In some embodiments, further includes a fourth reset component, and the fourth reset component being arranged between to the mounting portion and the unlocking component, for generating a force to make the unlocking component move towards the entrance.

In some embodiments, the locking component is configured to slide relative to the mounting portion axially, sliding towards the entrance to the first position or sliding away from the entrance to the second position.

In some embodiments, an annular protrusion surrounding the central axis is formed at an inner circumferential surface of the locking component, the annular protrusion includes a first annular wall and a first inclined wall opposite to the first annular wall along the central axis, the first annular wall faces to the entrance, and the first inclined wall is away from the entrance.

In some embodiments, the inner circumferential surface of the locking component includes a second inclined wall which is arranged around the central axis, and the second inclined wall is located at a side of the annular protrusion near the entrance.

In some embodiments, the unlocking component includes an unlocking portion, the unlocking portion includes a third inclined wall, and the second locking portion includes a fourth inclined wall, the third inclined wall is located between the fourth inclined wall and the entrance, along the radial direction along the axial direction, and the third inclined wall and is located at an outer side of the fourth inclined wall along the radial direction.

In some embodiments, the locking component is configured to rotate relative to the mounting portion about the central axis, an inner circumferential surface of the locking component includes an arc-shaped wall arranged around the central axis, and a radial distance between the arc-shaped wall and the central axis increases gradually along a circumferential direction.

In some embodiments, an end of the first locking portion away from the central axis is arc shaped.

In some embodiments, a first limit portion and a second limit portion are respectively formed at two ends of the arc-shaped wall along the circumferential direction to abut the first locking portion.

In some embodiments, an arc-shaped groove is defined in the locking component surrounding the central axis, and the first reset component is arranged in the arc-shaped groove with one end thereof connected to the mounting portion and the other end thereof connected to the locking component.

In some embodiments, the first mounting hole includes a first hole portion and a second hole portion at an inner side of the first hole portion, a cross section of the second hole portion is less than that of the first hole portion, and a step is formed at a junction of the second hole portion and the first hole portion; the first locking portion includes a contact part facing to the step, and the second reset component is arranged between the contact part and the step with one end thereof connected to the step and the other end thereof connected to the contact part.

In some embodiments, the arc-shaped groove is located between the entrance of the mounting groove and the arc-shaped wall along the axial direction.

In some embodiments, the second mounting hole extends through the annular wall and communicates with the mounting groove, one end of the second locking portion is connected to the unlocking portion and the other end extends through the second mounting hole to the outside along a direction perpendicular to the central axis, an end of the locking component away from the entrance of the mounting groove defines a limiting groove, and the limiting groove extends through the inner circumferential surface and communicates with the second mounting hole along a direction perpendicular to the central axis.

In some embodiments, the second component further includes an annular flange supporting the locking component thereon, the annular flange is located at a bottom side of the locking component and extends beyond the annular wall along the radial direction, and the second mounting hole extends into the annular flange.

The quick connection structure provided by the present application can realize quick assembly and disassembly of two structures. For example, when the quick connection structure of the present application is applied to the photographing equipment, the first component may be a movable component for connecting a camera, and the second component may a fixed component for connecting a Pan-Tilt mounted on a tripod. The assembly and disassembly of the first component and the second component realizes the assembly and disassembly of the camera and the tripod.

During assembly of the first component and the second component of the quick connection structure of the present application, a hand of the operator may move the locking component relative to the second component from the first position to the second position where the locking component can be locked by the second locking portion and thus the hand of the operator can be removed, and then the first component can be inserted into the mounting groove of the second component by a single hand. During the inserting of the first component into the mounting groove, the unlocking portion is driven to unlock the locking component, which makes the second locking portion release the locking component, thereby the locking component being able to move to the first position, completing the locking of the first component by the first locking portion. The whole assembly process mentioned above can be completed by the operator with a single hand, which is convenient and fast. However, in the related art, one hand of the operator needs to always maintain the locking component at the second position, and the other hand needs to insert the first component, which is inconvenient. The disassembly process of the first component and the second component is basically opposite to the assembly process, which will not be described here.

BRIEF DESCRIPTION OF THE DRAWINGS

In order to illustrate technical solutions of embodiments of the present application more clearly, drawings that need to be used in the description of the embodiments will be briefly described below. It is obvious that the drawings described below are only some embodiments of the present application, and other drawings may be obtained from the drawings without any creative work to those skilled in the art, which should be in the scope of this application. In the following description, the same reference numerals refer to the same members.

DESCRIPTION OF THE EMBODIMENTS

Figure 1:
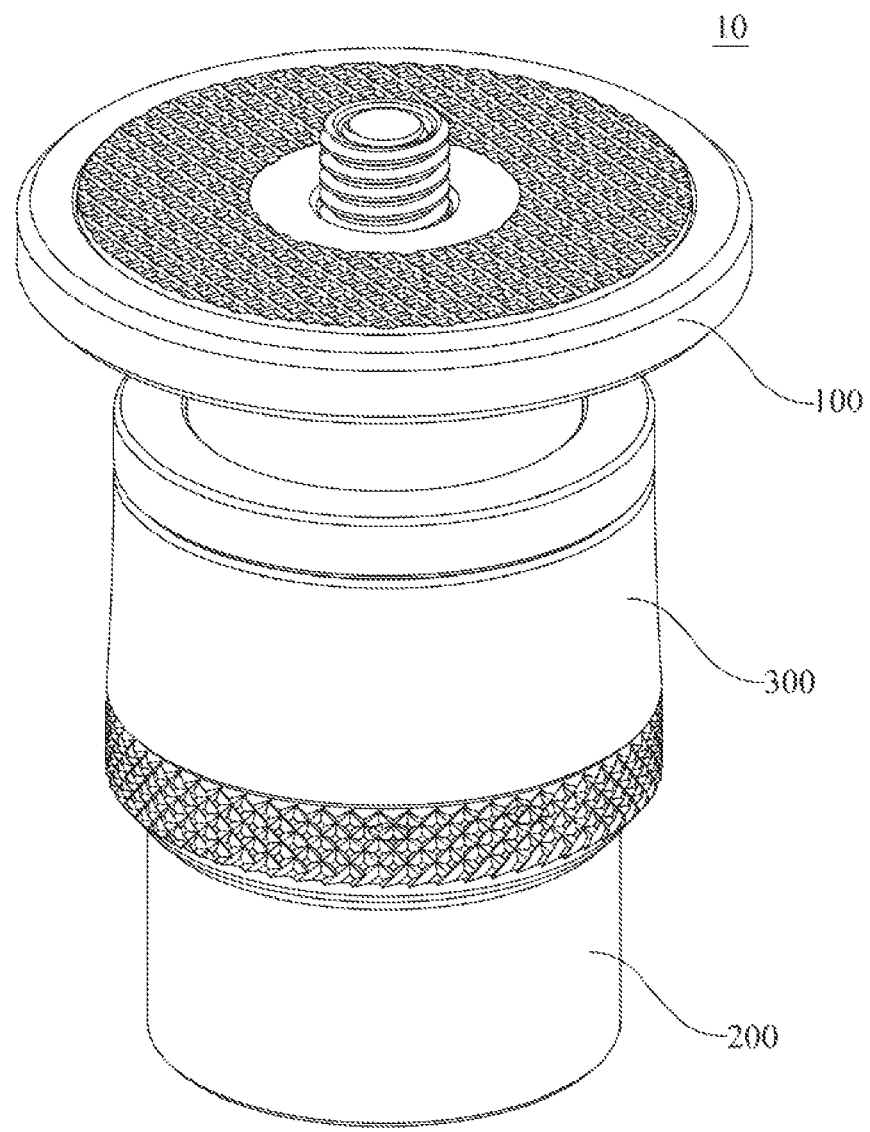
FIG. 1 is a schematic, assembled view of a quick connection structure provided by a first embodiment of the present application.

For better illustrating the technical means, creative features, objects and effects of the present application, detailed description will be given for the embodiments provided by the present application with reference to the append drawings. Obviously, the described embodiments are only a part of the embodiments, and not all of the embodiments of the present application. Based on the embodiments of the present application, all other embodiments obtained by those skilled in the art without any creative work should be in the scope of this application.

It should be noted that when an element is referred to as being "fixed to" or "disposed in/at" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present disclosure, "a plurality of" refers to two or more than two, unless otherwise particularly defined.

Referring to FIGS. 1-7, a first embodiment of the present application provides a quick connection structure 10, which is more convenient to assemble or disassembly. In order to facilitate the description, in this embodiment, application of the quick connection structure 10 to the technical field of photographic equipment is exemplified.

The quick connection structure 10 includes a first component 100, a second component 200, a locking component 300, and a first reset component 400. In this embodiment, the first component 100 is a movable component for supporting a camera, and the second component 200 is a fixed component for connecting a Pan-Tilt which is generally mounted on a tripod. A screw may be connected to the first component 100 with an end thereof extending upwardly for quick connection of the camera, and a screw hole or a dovetail groove may be defined in the second component 200 for quick connection of the Pan-Tilt. The assembly and disassembly of the first component 100 and the second component 200 realizes the assembly and disassembly of the camera and the tripod. In other embodiments, the first component 100 may be connected to the tripod, and the second component 200 may be connected to the camera, which will not be described here.

The second component 200 includes a mounting portion 210 defining a mounting groove 211 therein for receiving the first component 100, and a first locking portion 290 movably connected to the mounting portion 210 for locking the first component 100. The mounting groove 211 extends along a central axis 241 of the mounting portion 210, and the first component 100 can be inserted axially into the mounting groove 211. A top end of the mounting groove 211 functions as an entrance 2111, for entering of the first component 100 into the mounting groove. When the first locking portion 290 is at a locking position, the first component 100 which is inserted into the mounting groove 211 can be locked; and when the first locking portion 290 is at an unlocking position, the first component 100 in the mounting groove 211 can be unlocked and then removed. When the first component 100 is inserted into a predetermined position of the mounting groove 211 and the first locking portion 290 is at the locking position, the first component 100 can be locked, thereby completing the connection of the first component 100 and the second component 200, realizing the quick assembly of the camera and the tripod.

The locking component 300 is movably connected to the mounting portion 210, and is capable of moving relative to the mounting portion 210 to a first position or a second position. That is, the locking component 300 is capable of moving back and forth between the first position and the second position. Moving of the locking component 300 to the first position and the second position described in this application both are relative to the mounting portion 210. The locking component 300 may slide to the first position or the second position along a straight line or a curve, or may rotate to the first position or the second position. In this embodiment, the locking component 300 slides to the first position or the second position along a straight line. The locking component 300 is configured to drive the first locking portion 290 to the locking position during the sliding motion thereof to the first position, and enable the first locking portion 290 to return to the unlocking position when moving to the second position.

When the first component 100 is inserted into the predetermined position of the mounting groove 211, the locking component 300 is capable of driving the first locking portion 290 to move from the unlocking position to the locking position after the locking component 300 moves from the second position to the first position, thereby realizing the locking of the first component 100. After the locking component 300 moves from the first position to the second position, the first locking portion 290 is capable of moving to the unlocking position, thereby enabling the first component 100 to be separated from the mounting portion 210. It should be noted that the locking component 300 may drive the first locking portion 290 directly or indirectly, i.e., through other components. In this embodiment, the locking component 300 drives the first locking portion 290 directly. After the locking component 300 moves to the second position, the first locking portion 290 may return to the unlocking position automatically, for example by gravity. Alternatively, the first locking portion 290 may return to the unlocking position under an action of an elastic member or a magnetic member; or, return to the unlocking position by a propulsive force applied thereon when the first component 100 exiting from the mounting groove 211.

In summary, in this embodiment, when the locking component 300 at the first position, the first component 100 can be connected the second component 200; and when the locking component 300 at the second position, the first component 100 and the second component 200 can be separated from each other.

The first reset component 400 is connected to the locking component 300 and the mounting portion 210, respectively, and generates a force to drive the locking component 300 to move to the first position. In this embodiment, the locking component 300 can be designed to stay at the first position at an initial state. When the first reset component 400 is not pushed to slide relative to the mounting portion 210 by the operator, the first reset component 400 is capable of pushing the locking component 300 to stay at the first position. The first reset component 400 may be a spring, a magnetic member, and etc. In this embodiment, the first reset component 400 is a spring.

In that case where the quick connection structure only has the above-mentioned constructions, the first component 100 cannot be inserted into the predetermined position of the mounting groove 211 since the locking component 300 at the first position and the first locking portion 290 at the locking position. When the first component 100 needs to be assembled onto the second component 200, the locking component 300 needs to be held by one hand of the operator to make it stay at the second position, so that the first component 100 can be inserted into the predetermined position of the mounting groove 211. After the first component 100 is inserted into the predetermined position of the mounting groove 211 by the other hand of the operator to unlock the locking component 300, the hand holding the locking component 300 can be removed, and thus the first reset component 400 is capable of pushing the locking component 300 to move back to the first position, thereby completing the locking of the first component 100. During the above assembly process, the operator needs to operate with two hands, and the hand holding the locking component 300 needs to apply force continuously, which is inconvenient.

In view of this, in this embodiment, the second component 200 further includes a second locking portion 270 and an unlocking portion 281. The second locking portion 270 is configured to lock the locking component 300 at the second position. The unlocking portion 281 is configured to drive the second locking portion 270 to release the locking component 300 after obtaining a driving force, which is given to the unlocking portion 281 during the inserting of the first component 100 into the mounting groove 211. In other words, after the locking component 300 slides to the second position by the operator, the second locking portion 270 locks the locking component 300 at the second position, thus the operator does not need to continuously apply force to the locking component 300. During the inserting of the first component 100 into the mounting groove 211, the unlocking portion 281 can be driven to move, which in turn drives the second locking portion 270 to unlock the locking component 300, thereby the locking component 300 being able to return to the first position under the driving force of the first reset component 400, and then making the first locking portion 290 lock the first the member 100.

In this embodiment, during the assembly of the first component 100 and the second component 200 of the present quick connection structure 10, firstly the locking component 300 slides relative to the second component 200 by one hand of the operator to the second position, where the locking component 300 can be locked by the second locking portion 270 and the hand of the operator holding the locking component 300 can be removed; and then, the first locking portion 290 moves to the unlocking position, which makes the first component 100 can be inserted into the mounting groove 211 by one hand. During the inserting of the first component 100 into the mounting groove 211, the unlocking portion 281 is driven to make the second locking portion 270 unlock the locking component 300, thereby the locking component 300 being capable of moving back to the first position, and then making the first component 100 be locked by the first locking portion 290. The whole assembly process described above can be completed by a single hand of the operator, which is convenient and fast.

Figure 5:
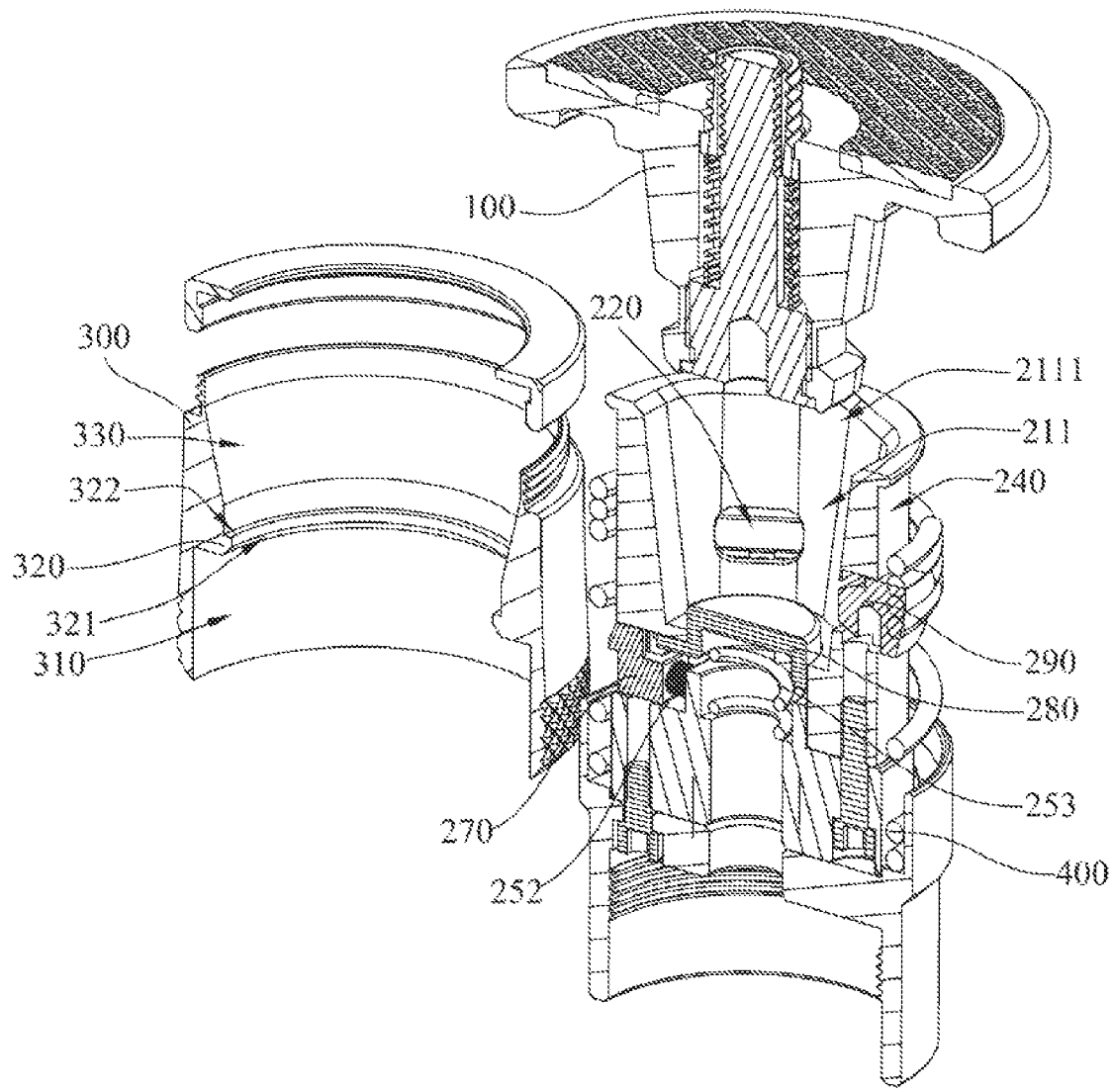
FIG. 5 is an exploded, cross-sectional view of the quick connection structure provided by the first embodiment of the present application.
Figure 6:
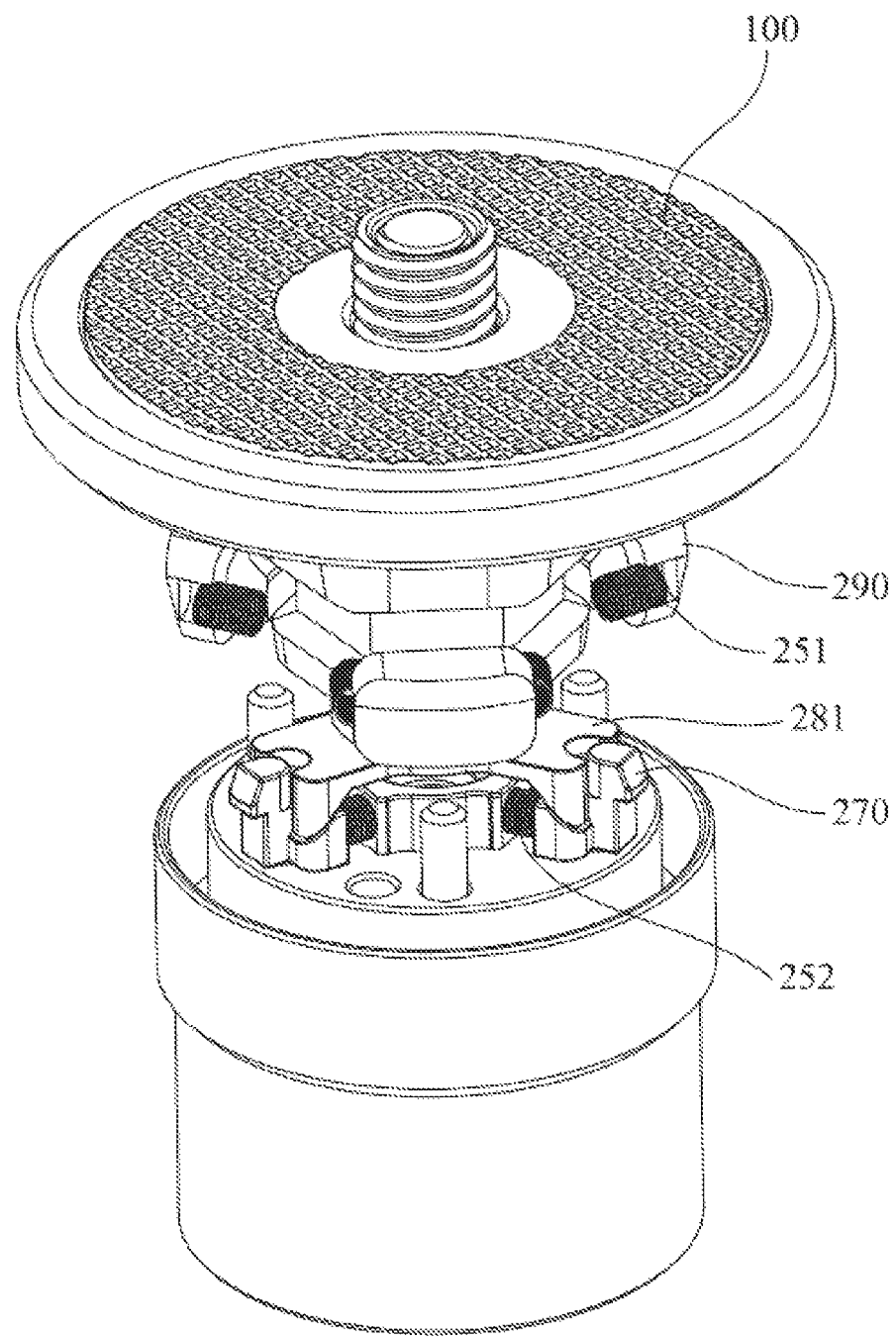
FIG. 6 is a schematic view of the quick connection structure provided by the first embodiment of the present application after removing a mounting portion and a locking component thereof.
Figure 7:
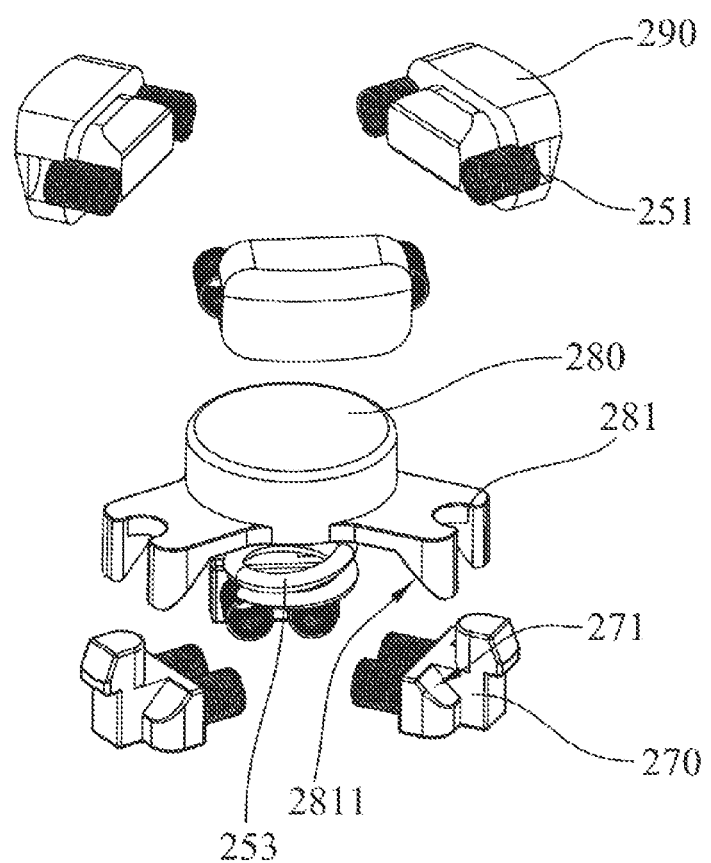
FIG. 7 is a schematic, exploded view of a first locking portion, a second locking portion a second reset component, a third reset component, a fourth reset component and an unlocking component of the quick connection structure provided by the first embodiment of the present application.
Figure 8:
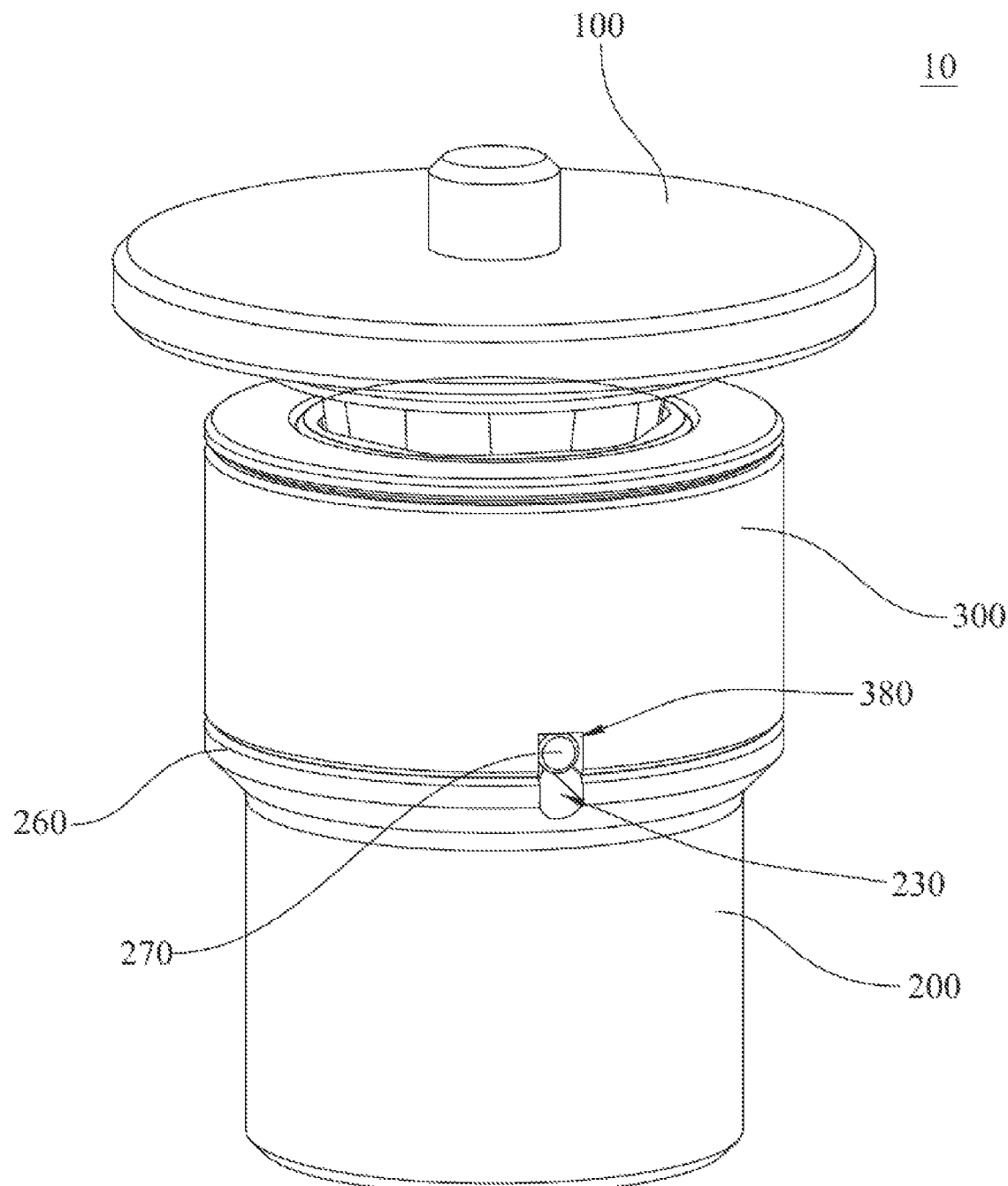
FIG. 8 is a schematic, assembled view of the quick connection structure provided by a second embodiment of the present application.
Figure 9:
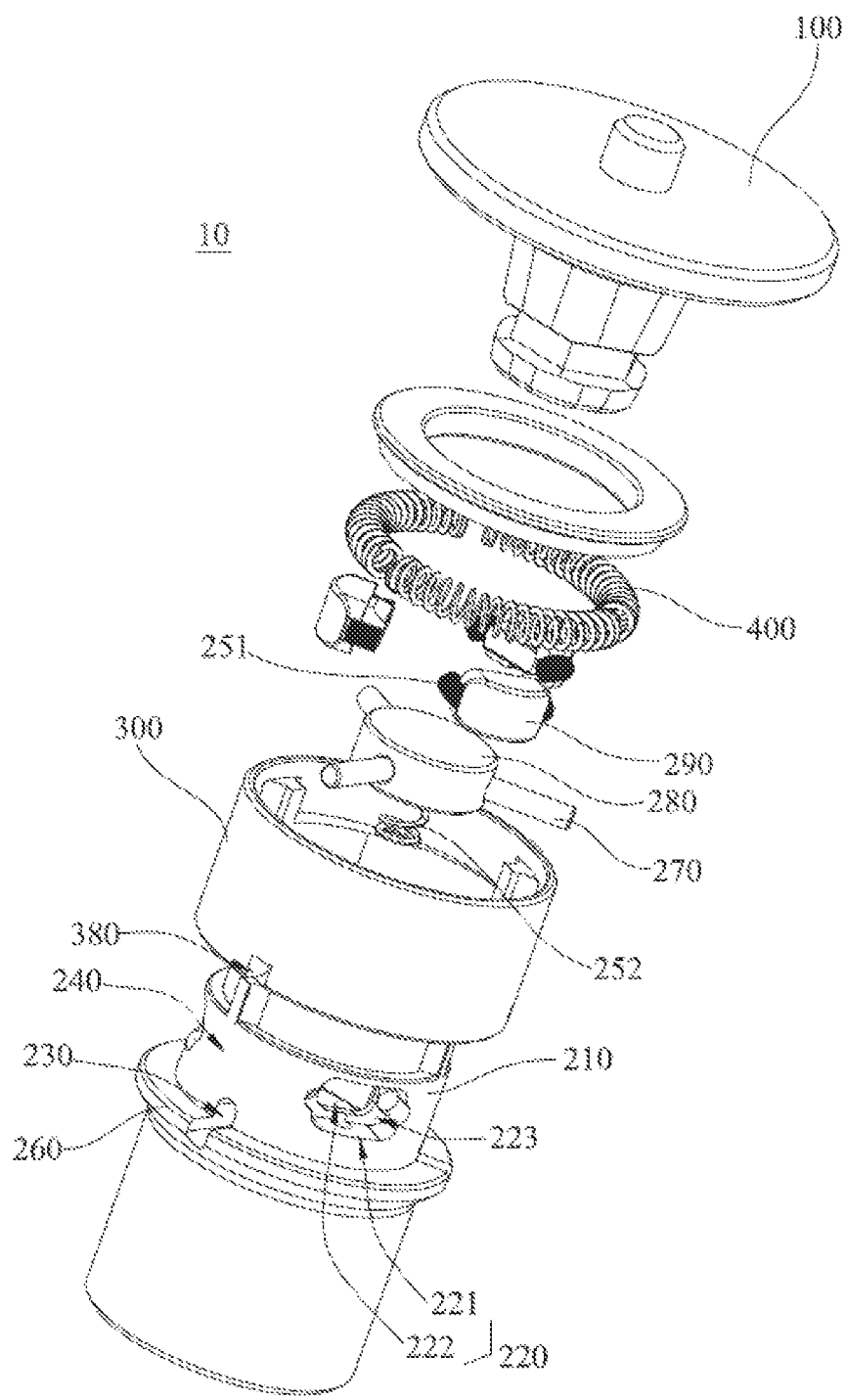
FIG. 9 is a schematic, exploded view of the quick connection structure provided by the second embodiment of the present application.
Figure 10:
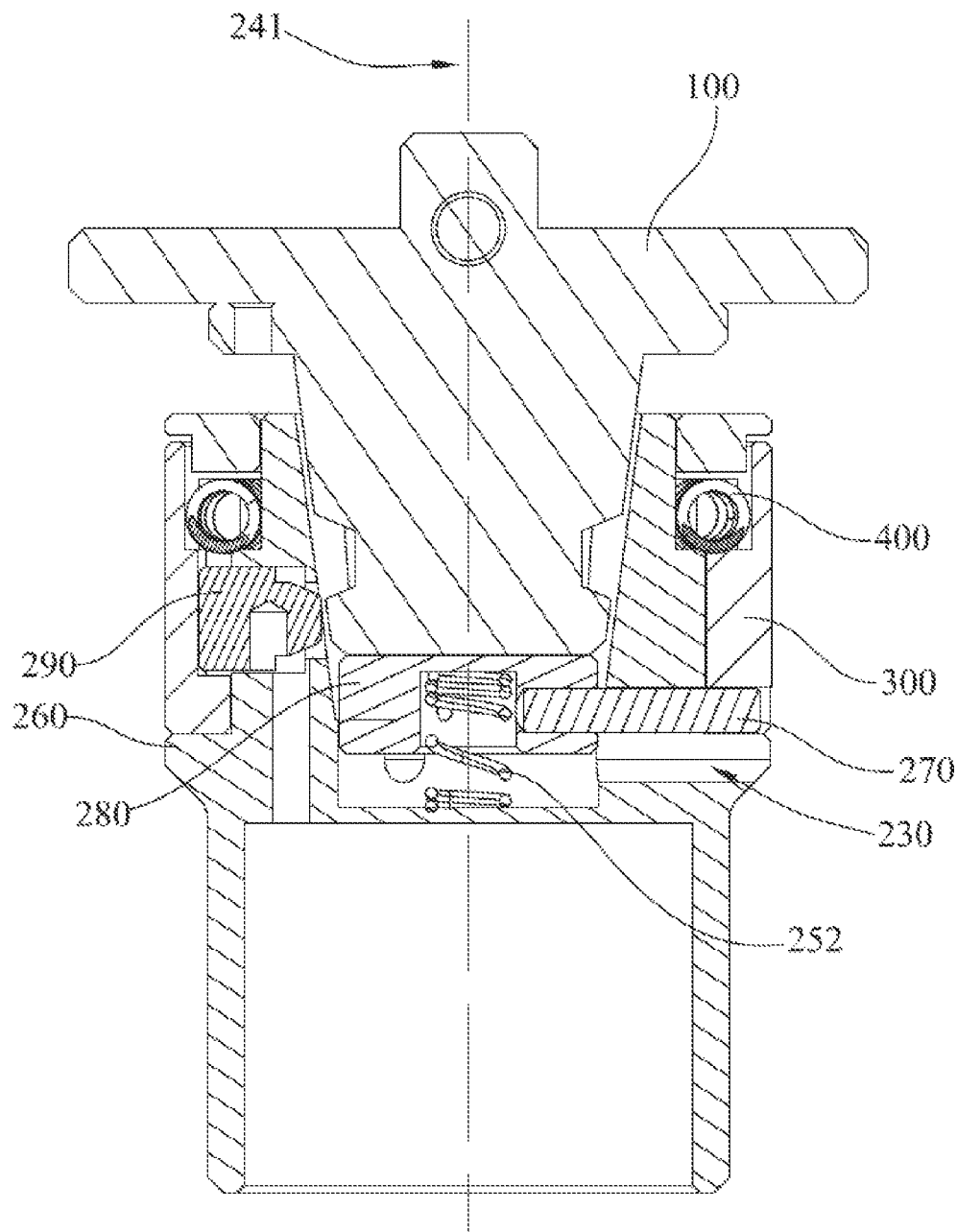
FIG. 10 is a cross-sectional view of the quick connection structure provided by the second embodiment of the present application.
Figure 11:
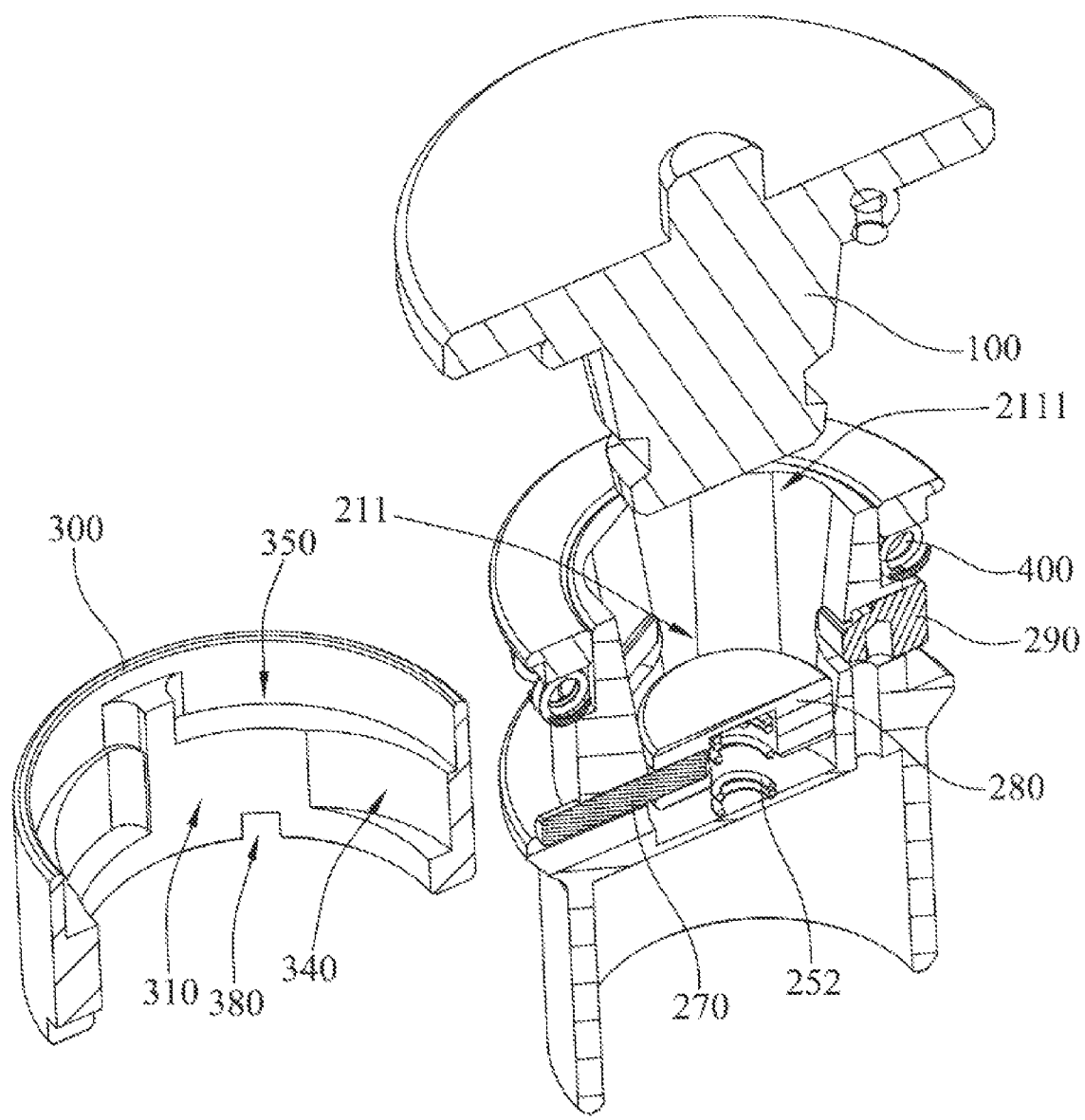
FIG. 11 is an exploded, cross-sectional view of the quick connection structure provided by the second embodiment of the present application.

The specific construction of the first locking portion 290 to lock the first component 100 may be designed according to need. In this embodiment, the mounting portion 210 includes an annular wall 240 which surrounds the central axis 241. The mounting groove 211 is defined in the annular wall 240 and extends along the central axis 241. As shown in FIG. 5, the mounting portion 210 defines a first mounting hole 220 therein, which extends radially through the annular wall 240 and communicates with the mounting groove 211. The first locking portion 290 is movably mounted in the first mounting hole 220, and is capable of moving along the radial direction towards the central axis 241 to enter into the mounting groove 211, i.e., to the locking position; or, moving along the radial direction away from the central axis 241 to extend out of the annular wall 240, i.e., to the unlocking position. In this embodiment, the first component 100 may define a slot cooperating with the first locking portion 290. When an inner end of the first locking portion 290 extends into the mounting groove 211 and engages into the slot of the first component 100, the first component 100 is locked. In other embodiments, the first component 100 may be locked by a pressing force of the first locking portion 290.

The quick connection structure 10 further includes a second reset component 251, which is connected to the mounting portion 210 and the first locking portion 290, respectively. The second reset component 251 generates a driving force to make the first locking portion 290 move to the unlocking position. That is, after the locking component 300 slides to the second position, the second reset component 251 is able to drive the first locking portion 290 to the unlocking position where the first locking portion 290 exits out of the annular wall 240 to realize locking of the first component 100.

The locking component 300 is arranged at an outer side of the annular wall 240 along the radial direction, i.e., a side of the annular wall 240 away from the central axis 241. The locking component 300 slides axially and straightly. During the movement of the locking component 300 to the first position, the first locking portion 290 is pushed to move towards the central axis 241 to the locking position. During the sliding motion of the locking component 300 to the first position, the locking component 300 is capable of pushing the first locking portion 290 to move radially (i.e., along a direction perpendicular to the central axis 241) and inwardly to the locking position.

The locking component 300 is annular, and is mounted around the annular wall 240. The locking component 300 is configured to be slidable with respect to the mounting portion 210 along a direction parallel to the central axis 241. The locking component 300 may slide upwardly (i.e., along a direction towards the entrance 2111 of the mounting groove 211) to the first position or slide downwardly (i.e., along a direction away from the entrance 2111 of the mounting groove 211) to the second position. In this embodiment, the locking component 300 may push the first locking portion 290 through an inner circumferential surface 310 thereof.

The first reset component 400 is arranged between the locking component 300 and the annular wall 240. The first reset component 400 is a spring, which is mounted around the annular wall 240. An end of the spring away from the entrance 2111 abuts against the mounting portion 210, and an end of the spring near the entrance 2111 abuts against the locking component 300.

Figure 2:
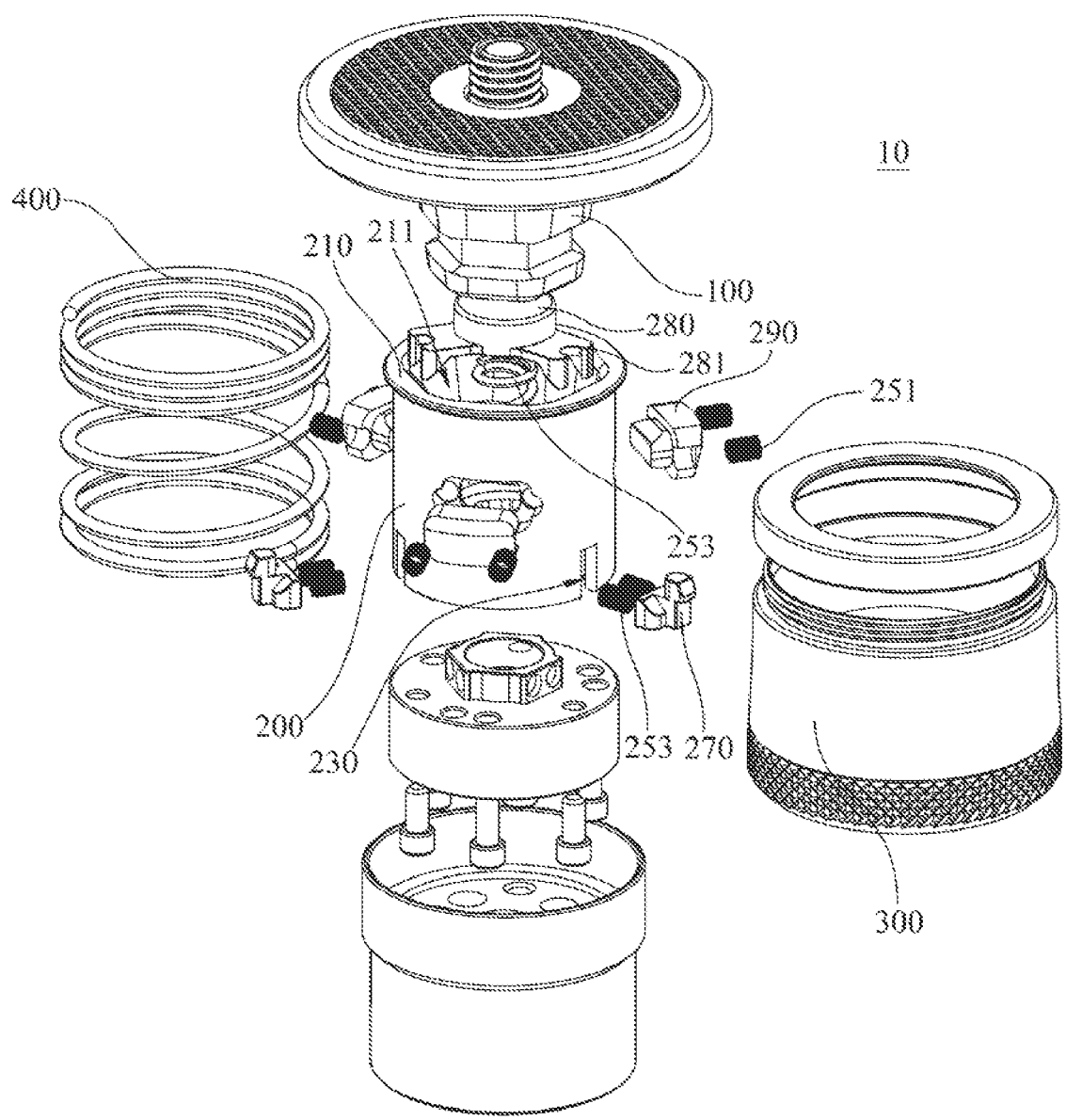
FIG. 2 is a schematic, exploded view of the quick connection structure provided by the first embodiment of the present application.
Figure 3:
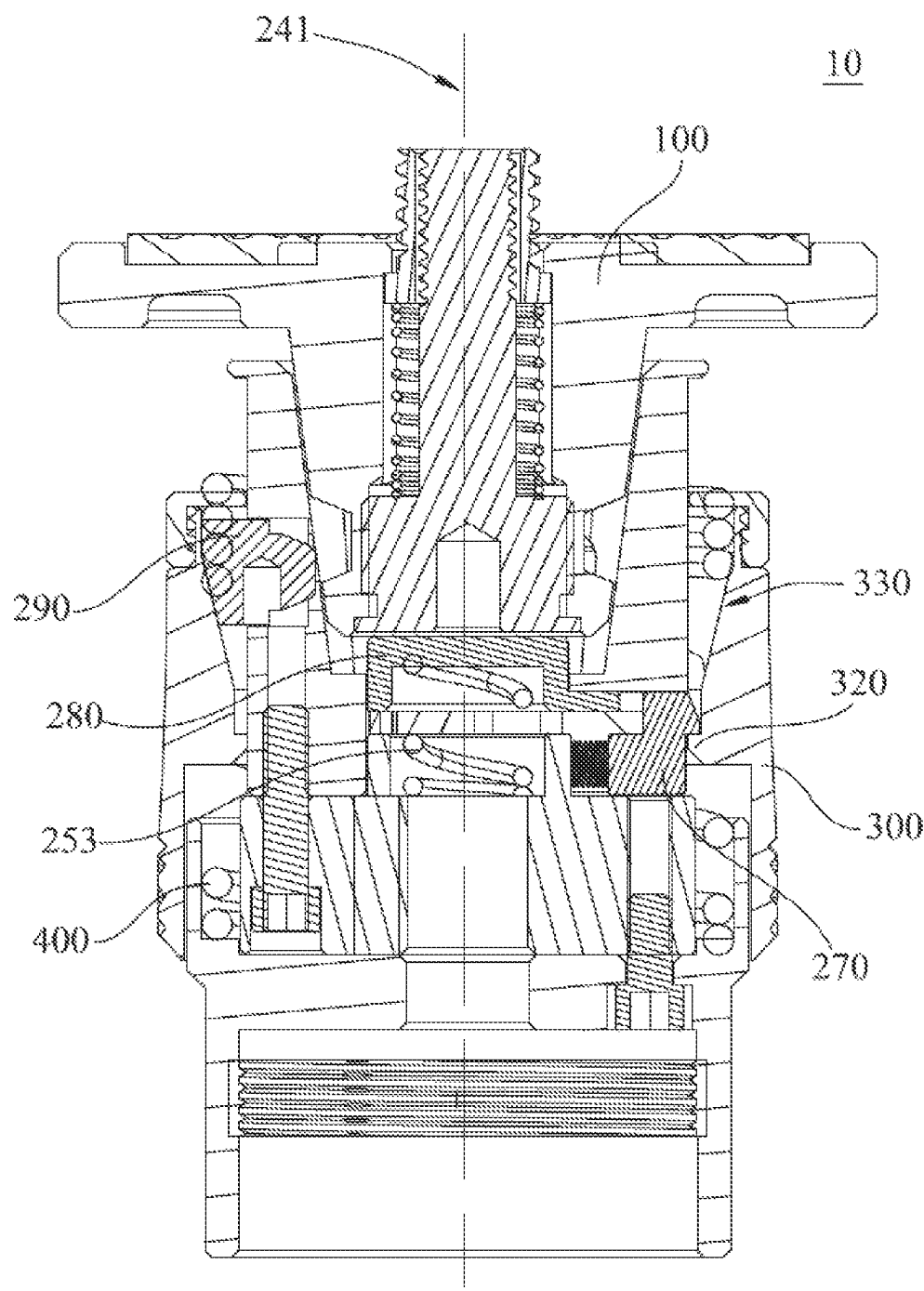
FIG. 3 is a cross-sectional view of the quick connection structure provided by the first embodiment of the present application.
Figure 4:
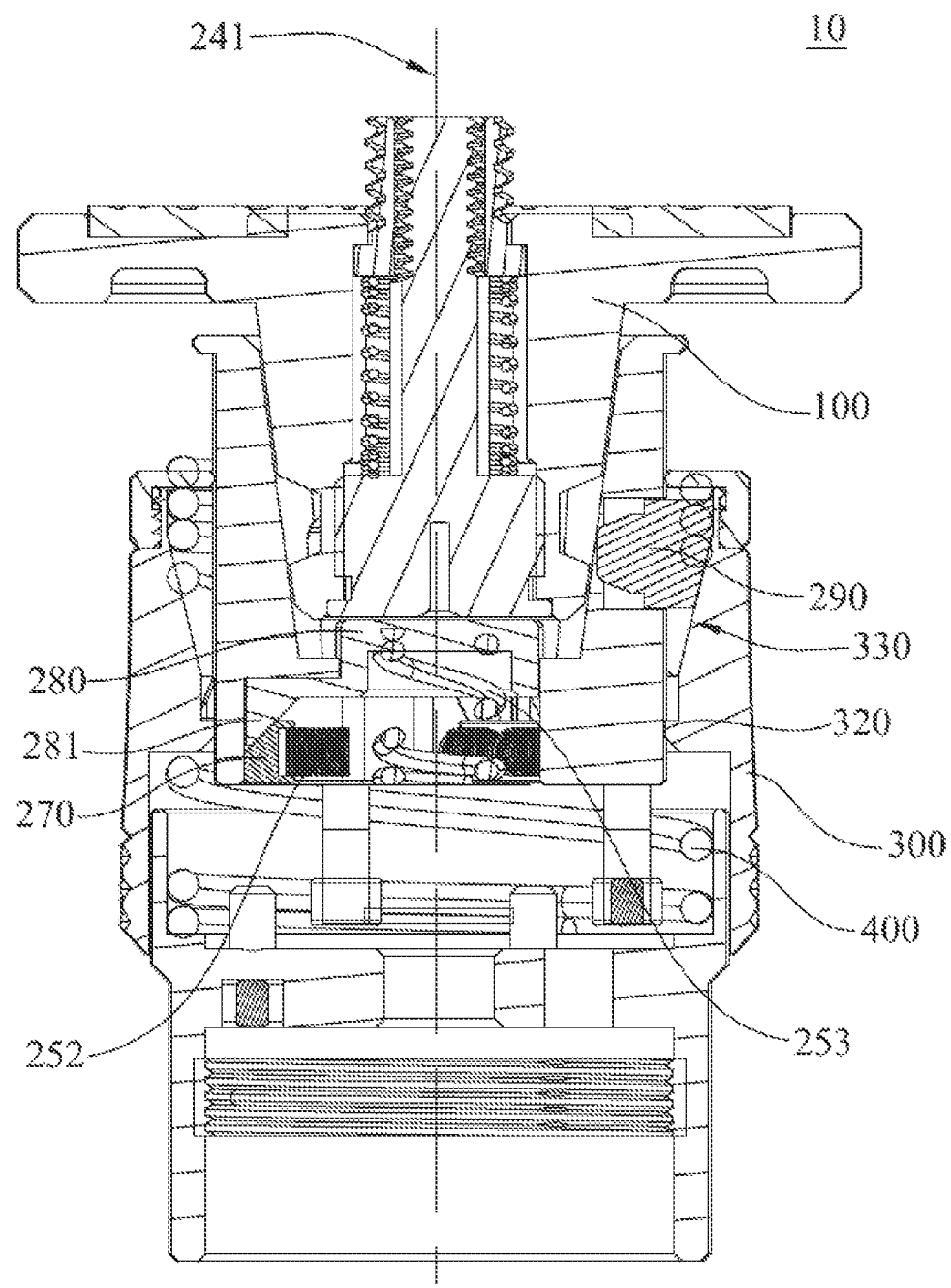
FIG. 4 is another cross-sectional view of the quick connection structure provided by the first embodiment of the present application.

As shown in FIG. 2, the mounting portion 210 defines a second mounting hole 230 therein, the second mounting hole 230 extends radially through the annular wall 240 and communicates with the mounting groove 211. The second locking portion 270 is movably mounted in the second mounting hole 230, and is capable of sliding radially to extend out of the annular wall 240 to lock the locking component 300 at the second position, or sliding radially towards the central axis 241 to a position to unlock the locking component 300.

The quick connection structure 10 further includes a third reset component 252, which may be a spring in an embodiment. The third reset component 252 is mounted in the second mounting hole 230, and can generate a driving force to make the second locking portion 270 extend out of the annular wall 240 to lock the locking component at the second position 300. During the movement of the locking component 300 to the second position, the second locking portion 270 is pushed to slide radially towards the central axis 241. After the locking component 300 moves to the second position, the third reset component 252 drives the second locking portion 270 to slide radially away from the central axis 241, thereby making the second locking portion 270 lock the locking component 300.

The inner circumferential surface 310 of the locking component 300 is provided with an annular protrusion 320 which is arranged around the central axis 241. The annular protrusion 320 includes a first annular wall 322 and a first inclined wall 321. The first annular wall 322 and the first inclined wall 321 are arranged opposite to each other along the axial direction. The first annular wall 322 faces to the entrance 2111, and the first inclined wall 321 is away from the entrance 2111. During the movement of the locking component 300 from the first position to the second position, the first inclined wall 321 pushes the second locking portion 270 to slide radially towards the central axis 241; and, the second locking portion 270 is pushed by the third reset component 252 to abut against the first annular wall 322 after the annular protrusion 320 slides over the second locking portion 270, thereby the second locking portion 270 locking the locking component 300.

The inner circumferential surface 310 of the locking component 300 includes a second inclined wall 330 which is arranged around the central axis 241. The second inclined wall 330 is located at a side of the annular protrusion 320 near the entrance 2111. The second inclined wall 330 is configured to push the first locking portion 290 to extend out of the annular wall 240 when the locking component 300 slides from the second position to the first position, thereby pushing the first locking portion 290 to the locking position.

An unlocking component 280 is mounted in the mounting groove 211, and is located at an end of the mounting groove 211 away from the entrance 2111. The unlocking component 280 is configured to push the second locking portion 270 to move radially towards the central axis 241 when it moves away from the entrance 2111.

The quick connection structure 10 further includes a fourth reset component 253, which is connected to the mounting portion 210 and the unlocking component 280, respectively. The fourth reset component 253 is configured to generate a driving force to make the unlocking component 280 move towards the entrance 2111.

The unlocking component 280 includes the unlocking portion 281, which can extend into the second mounting hole 230. As shown FIG. 7, the unlocking portion 281 includes a third inclined wall 2811, and the second locking portion 270 includes a fourth inclined wall 271. The third inclined wall 2811 is located between the fourth inclined wall 271 and the entrance 2111, and is located at an outer side of the fourth inclined wall 271 which is away from the central axis 241 along the radial direction. When the unlocking portion 281 moves away from the entrance 2111, the third inclined wall 2811 comes into contact with the fourth inclined wall 271, thereby pushing the second locking portion 270 to move radially towards the central axis 241.

The assembly process of the quick connection structure 10 of this embodiment is as follows:

The operator pushes the locking component 300 from the first position (a position near the entrance 2111 of the mounting groove 211) to the second position along the axial direction away from the entrance 2111 of the mounting groove 211, the first locking portion 290 returns to the unlocking position, i.e., a position that the first locking portion 290 extends out of the annular wall 240 of the mounting portion 210 from the locking position under the driving force of the second reset component 251 during the sliding motion of the locking component 300 to the second position, which makes the first component 100 can be inserted into the predetermined position of the mounting groove 211. During the sliding motion of the locking component 300 to the second position, under the cooperation of the annular protrusion 320 and the second locking portion 270, firstly the second locking portion 270 is pushed by the locking component 300 to move radially towards the central axis 241, and then the second locking portion 270 moves radially away from the central axis 241 to lock the locking component 300 after the locking component 300 reaching the second position, thereby making the locking component 300 stay at the second position.

The operator inserts the first component 100 into the mounting groove 211 to press the unlocking component 280 downwardly, the inserting of the first component 100 pushes the unlocking component 280 to move away from the entrance 2111 of the mounting groove 211. Under the cooperation of the unlocking portion 281 and the second locking portion 270, the unlocking portion 281 pushes the second locking portion 270 to move radially towards the central axis 241 to a position where the locking component 300 can be unlocked. After the first component 100 is inserted into the predetermined position of the mounting groove 211 and the locking component 300 is unlocked, the first reset component 400 pushes the locking component 300 to move back to the first position, and the first locking portion 290 is pushed to move to the locking position to lock the first component 100 during the movement of the locking component 300 to the first position, thereby completing the locking of the first component 100.

Referring to FIGS. 8-14, a second embodiment of the present application provides a quick connection structure 10, which includes a first component 100, a second component 200, a locking component 300 and a first reset component 400. In this embodiment, the first component 100 is a movable component for connecting a camera, and the second component 200 is a fixing component for connecting a tripod. The assembly and disassembly of the first component 100 and the second component 200 realizes the assembly and disassembly of the camera and the tripod. In other embodiments, the first component 100 may be connected to the tripod, and the second component 200 may be connected to the camera, which will not be described here.

The second component 200 includes a mounting portion 210, and the mounting portion 210 includes an annular wall 240 arranged around the central axis 241. The mounting portion 210 defines a mounting groove 211 therein, the mounting groove 211 extends along the central axis 241. The mounting portion 210 defines a first mounting hole 220 which extends through the annular wall 240 radially, i.e., along a direction perpendicular to the central axis 241. The second component 200 further includes a first locking portion 290 movably mounted in the first mounting hole 220. When the first locking portion 290 slides to the locking position, i.e., extends into the mounting groove 211, the first component 100 inserted into the mounting groove 211 can be locked. When the first locking portion 290 slides to the unlocking position, i.e., withdrawn from the mounting groove 211, the first component 100 can be unlocked.

The locking component 300 is movably connected to the mounting portion 210, and may rotate relative to the mounting portion 210 about the central axis 241 to the first position or the second position. The locking component 300 is configured to drive the first locking portion 290 to the locking position during the rotation thereof to the first position, and enable the first locking portion 290 to return to the unlocking position when it rotates to the second position.

The first reset component 400 is connected to the locking component 300 and the mounting portion 210, respectively, and generates a force to drive the locking component 300 to move to the first position. The second component 200 further includes a second locking portion 270 and an unlocking portion 281. The second locking portion 270 is configured to lock the locking component 300 at the second position. The unlocking portion 281 is configured to drive the second locking portion 270 to release the locking component 300 after obtaining a driving force, which is given to the unlocking portion 281 during the inserting of the first component 100 into the mounting groove 211. The difference between this embodiment and the first embodiment is that: the locking component 300 of this embodiment is rotatable relative to the mounting portion 210 for realizing locking of the first component 100. The quick connection structure 10 of this embodiment also has the technical effect of facilitating the assembly and disassembly.

The locking component 300 is annular, and is mounted around the second component 200. The locking component 300 includes an inner circumferential surface 310 arranged around the central axis 241, and the inner circumferential surface 310 includes an arc-shaped wall 340 arranged around the central axis 241. Along a circumferential direction of the locking component 300, a radial distance between the arc-shaped wall 340 and the central axis 241 increases gradually. During the rotation of the locking component 300 relative to the mounting portion 210 along the circumferential direction, the arc-shaped wall 340 can push the first locking portion 290 to move from the unlocking position to the locking position.

Figure 12:
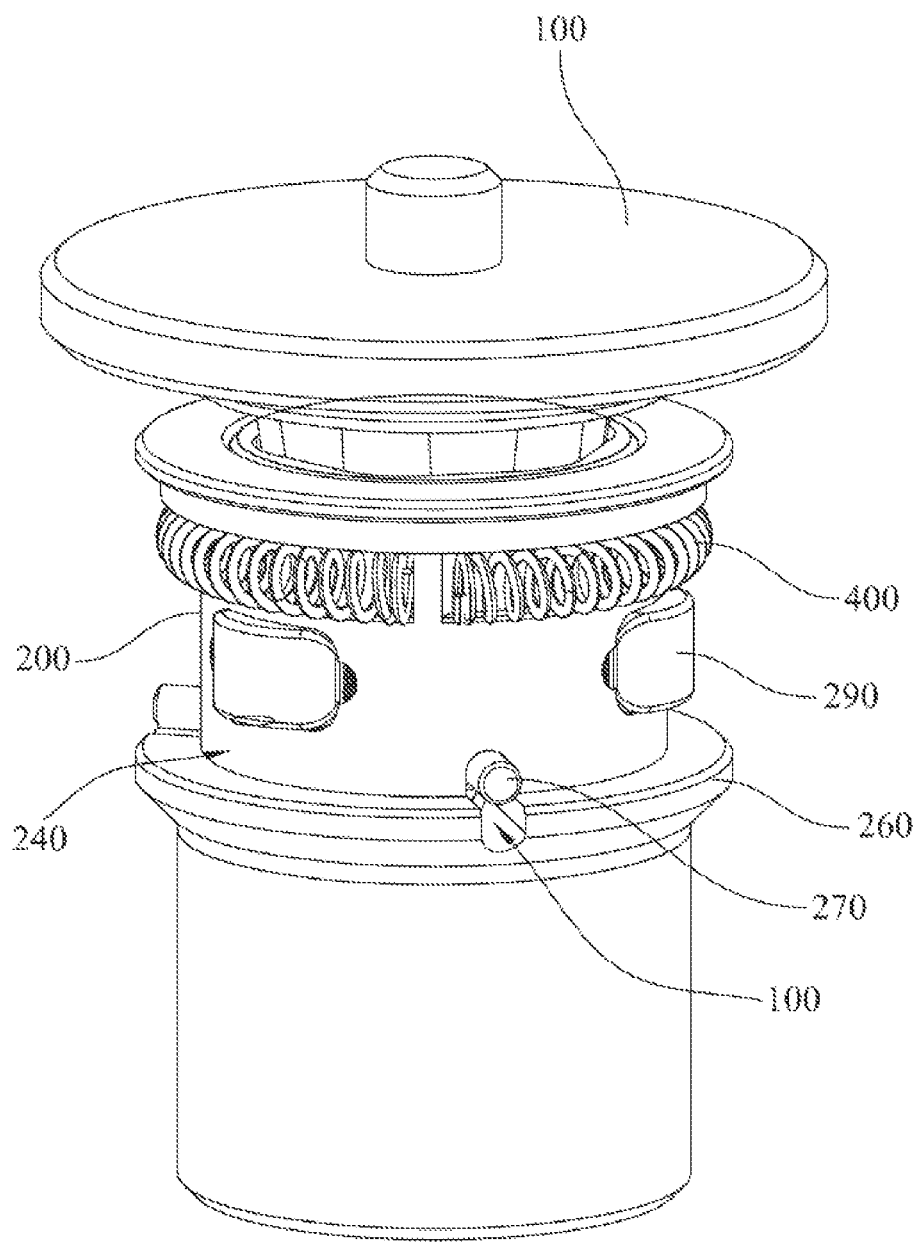
FIG. 12 is a schematic view of the quick connection structure provided by the second embodiment of the present application after removing the mounting portion and the locking component.
Figure 13:
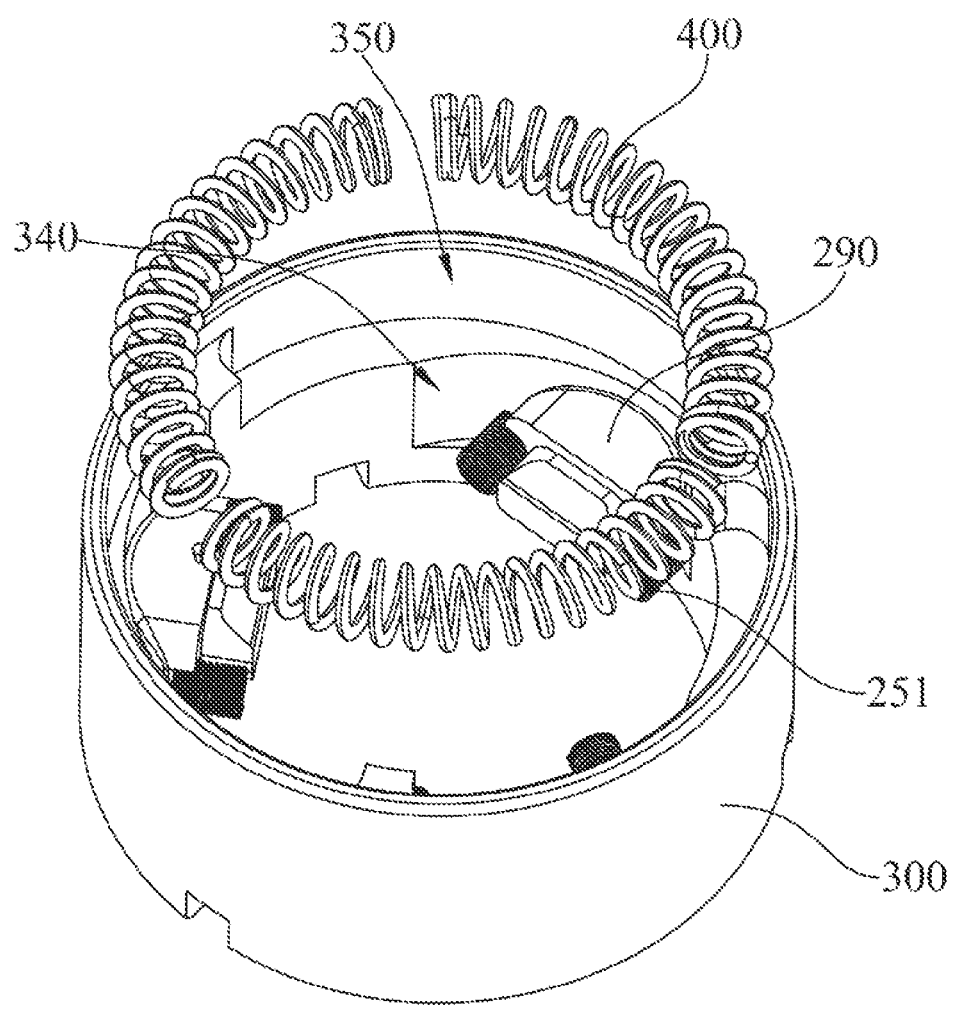
FIG. 13 is a schematic, exploded view of the locking component, the first locking portion, a first reset component and the second reset component of the quick connection structure provided by the second embodiment of the present application.

As shown in FIG. 12, an outer end of the first locking portion 290 away from the central axis 241 is arc shaped and matches with the arc-shaped wall 340, which facilitates the arc-shaped wall 340 to push the first locking portion 290 to slide radially.

Figure 14:
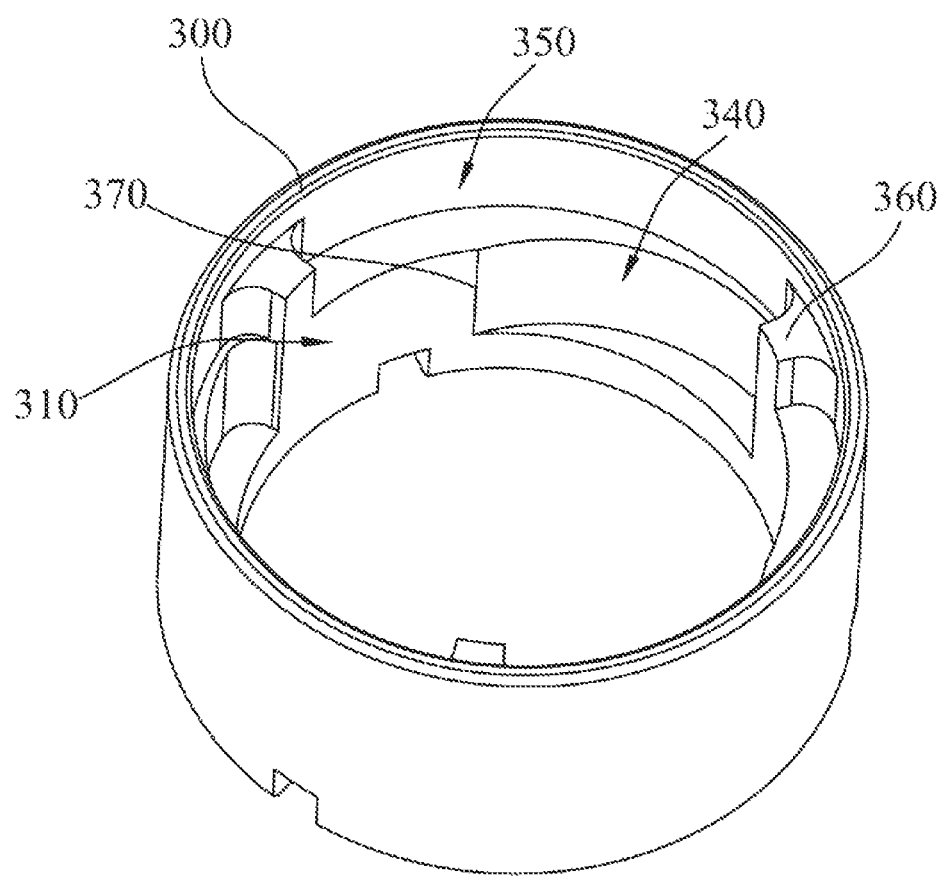
FIG. 14 is a schematic view of the locking component of the quick connection structure provided by the second embodiment of the present application.

As shown in FIG. 14, the inner circumferential surface 310 of the locking component 300 is further provided with a first limit portion 360 and a second limit portion 370, which are formed at two ends of the arc-shaped wall 340 along the circumferential direction, respectively. The first limit portion 360 and the second limit portion 370 are adapted to abut the first locking portion 290, respectively. In this embodiment, the first limit portion 360 and the second limit portion 370 cooperatively limit a rotation angle of the locking component 300.

As shown in FIG. 14, the inner circumferential surface 310 of the locking component 300 further defines an arc-shaped groove 350 arranged around the central axis 241. The first reset component 400 is a spring, and is mounted in the arc-shaped groove 350. One end of the first reset component 400 is connected to the mounting portion 210 and the other end is connected to the locking component 300. The first reset component 400 is capable of driving the locking component 300 to rotate about the central axis 241 to the first position.

The first mounting hole 220 includes a first hole portion 221 and a second hole portion 222, the second hole portion 222 is at an inner side of the first hole portion 221 along the radial direction and communicates with the mounting groove 221. An area of a cross section of the first hole portion 221 is larger than that of the second hole portion 222, and a step 223 is formed at a junction of the second hole portion 222 and the first hole portion 221.

The quick connection structure 10 further includes a second reset component 251, the first locking portion 290 includes a contact part facing the step 223, and the second reset component 251 is arranged between the contact part and the step 223 with one end thereof connected to the step 223 and the other end thereof connected to the contact part. The second reset component 251 generates a force to drive the first locking portion 290 move to the unlocking position. The force of the first reset component 400 is greater than that of the second reset component 251. Thus, after the locking component 300 is pushed to move to the first position by the first reset component 400, the second reset component 251 is compressed, and the first locking portion 290 is located at the locking position.

Along the axial direction, the arc-shaped groove 350 is located between the entrance 2111 of the mounting groove 211 and the arc-shaped wall 340.

The unlocking portion 281 is mounted at a bottom of the mounting groove 211. The quick connection structure 10 further includes a third reset component 252, one end of which is connected to the unlocking portion 281 and the other end is connected to the bottom of the mounting groove 211. The mounting portion 210 defines a second mounting hole 230, which extends through the annular wall 240 radially and communicates with the mounting groove 211. One end of the second locking portion 270 is connected to the unlocking portion 281, and the other end extends through the second mounting hole 230 to the outside. An end of the locking component 300 away from the entrance 2111 of the mounting groove 211 defines a limiting groove 380, which extends radially through the locking component 300 and communicates with the second mounting hole 230. The second locking portion 270 is connected to the unlocking portion 281, and is capable of moving axially under the driving of the unlocking portion 281. When the other end of the second locking portion 270 extending out of the annular wall 240 withdraws from the limiting groove 380, the locking component 300 is unlocked. When the other end of the second locking portion 270 extending out of the annular wall 240 moves into the limiting groove 380, the locking component 300 is locked. The third reset component 252 generates a force to push away the unlocking component 280 to make the second locking portion 270 extend into the limiting groove 380.

The second component 200 further includes an annular flange 260 for supporting the locking component 300 thereon. The annular flange 260 is located at a bottom side of the locking component 300, i.e., a side of the locking component 300 away from the entrance 2111, and extends beyond the annular wall 240 along the radial direction. The second mounting hole 230 extends into the annular flange 260. When the other end of the second locking portion 270 extending out of the annular wall 240 moves upwardly into an upper portion of the second mounting hole 230 (i.e., a portion in the annular wall 240) and withdraws from a lower portion of the second mounting hole 230 (i.e., a portion in the annular flange 260), the locking component 300 is locked. When the other end of the second locking portion 270 extending out of the annular wall 240 moves downwardly into the lower portion of the second mounting hole 230 and withdraws from the upper portion of the second mounting hole 230, the locking component 300 is unlocked.

The assembly process of the quick connection structure 10 of this embodiment is as follows:

The operator rotates the locking component 300 from the first position to the second position, the first locking portion 290 extends out of the annular wall 240 of the mounting portion 210 gradually and then returns to the unlocking position under the pushing force of the second reset component 251. During the rotation of the locking component 300 to the second position, after the limiting groove 380 is rotated to align with the second mounting hole 230, the second locking portion 270 in the second mounting hole 230 is pushed by the unlocking portion 281 to move axially towards the entrance 2111 of the fixing grove 211 to extend into the limiting groove 380, wherein the unlocking portion 281 is driven by the third reset component 252, thereby making the locking component 300 unable to rotate relative to the mounting portion 210, realizing locking of the locking component 300.

The operator can insert the first component 100 into the mounting groove 211 to push the unlocking portion 281 to move axially away from the entrance 2111, the second locking portion 270 withdraws from the limiting groove 380 gradually until the second locking portion 270 is unlocked. The unlocked locking component 300 rotates reversely towards the first position under the pushing of the first reset component 400, the arc-shaped wall 340 of the locking component 300 pushes the first locking portion 290 to move radially towards the central axis 241 to a position where the first component 100 is locked, thereby realizing the locking of the first component 100.

It should be noted that the description and the drawings of the present application give the preferred embodiments of the present application. However, the present application can be realized in many different forms, and is not limited to the embodiments described in the description. These embodiments are not an additional limitation on the contents of the present application. The purpose of providing these embodiments is to make the understanding of the disclosure of the present application more thorough and comprehensive. In addition, the above technical features continue to be combined with each other to form various embodiments not listed above, which are regarded as the scope of the description of the present application; Further, for those of ordinary skill in the art, improvements or changes can be made according to the above description, and all these improvements and changes should belong to the scope of protection of the claims attached to the present application.

The above merely provides the preferred embodiments of the present disclosure, which is illustrative, rather than restrictive, to the present disclosure. However, it should be understood by those skilled in the art that, many variations, modifications even substitutions that do not depart from the spirit and scope defined by the present disclosure, shall fall into the extent of protection of the present disclosure.

What is claimed is:

1. A quick connection structure, comprising:
   a first component;
   a second component comprising a mounting portion, a first locking portion, a second locking portion and an unlocking portion, the mounting portion defining a mounting groove for mounting the first component therein;
   a locking component being movably connected to the mounting potion, the locking component being capable of moving relative to the mounting portion to a first position or a second position; and
   a first reset component being arranged between the locking component and the mounting portion, for generating a force to drive the locking component to move to the first position;
   wherein the locking component drives the first locking portion to a locking position during the movement thereof to the first position and enables the first locking portion to return to an unlocking position when moving to the second position;
   wherein the first locking portion at the locking position is capable of locking the first component which is inserted into the mounting groove, and the first locking portion at the unlocking position is capable of unlocking the first component in the mounting groove;
   wherein the second locking portion is configured for locking the locking component at the second position; and the unlocking portion is configured for driving the second locking portion to unlock the locking component after obtaining a driving force which is given during the inserting of the first component into the mounting groove; and
   wherein the mounting portion comprises a wall arranged around a central axis, the mounting groove is defined in the wall, a first mounting hole is defined in the wall, and the first mounting hole extends radially through the wall and communicates with the mounting groove; and
   wherein the first locking portion is movably mounted in the first mounting hole, moving along a direction towards the central axis to extend into the mounting groove, thereby reaching the locking position; or, moving along a direction away from the central axis to withdraw from the mounting groove, thereby reaching the unlocking position.

2. The quick connection structure according to claim 1, wherein the wall of the mounting portion is an annular wall.

3. The quick connection structure according to claim 2, further comprising a second reset component, the second reset component being arranged between the mounting portion and the first locking portion, for generating a force to drive the first locking portion to move to the unlocking position.

4. The quick connection structure according to claim 3, wherein the locking component is annular and mounted around the annular wall, the first reset component is arranged between the locking component and the annular wall, one end of the first reset component away from an entrance of the mounting groove abuts against the annular wall, and the other end of the first reset component near the entrance abuts against the locking component.

5. The quick connection structure according to claim 4, wherein a second mounting hole is defined in the annular wall, and the second locking portion is movably mounted in the second mounting hole, the second locking portion being capable of sliding radially to extend out of the annular wall to lock the locking component at the second position or towards the central axis to a position to unlock the locking component.

6. The quick connection structure according to claim 5, further comprising a third reset component, the third reset component being mounted in the second mounting hole for generating a force to make the second locking portion extend out of the annular wall to lock the locking component at the second position; the second locking portion being pushed to slide towards the central axis during the movement of the locking component to the second position, the third reset component driving the second locking portion to slide away from the central axis after the locking component moving to the second position, thereby making the second locking portion lock the locking component.

7. The quick connection structure according to claim 6, wherein an unlocking component is arranged at an end of the mounting groove away from the entrance, for pushing the second locking portion to move towards the central axis when the unlocking component moves away from the entrance.

8. The quick connection structure according to claim 7, further comprising a fourth reset component, and the fourth reset component being arranged between to the mounting portion and the unlocking component, for generating a force to make the unlocking component move towards the entrance.

9. The quick connection structure according to claim 5, wherein the locking component is configured to slide relative to the mounting portion axially, sliding towards the entrance to the first position or sliding away from the entrance to the second position.

10. The quick connection structure according to claim 9, wherein an annular protrusion surrounding the central axis is formed at an inner circumferential surface of the locking component, the annular protrusion comprises a first annular wall and a first inclined wall opposite to the first annular wall along the central axis, the first annular wall faces to the entrance, and the first inclined wall is away from the entrance.

11. The quick connection structure according to claim 10, wherein the inner circumferential surface of the locking component comprises a second inclined wall which is arranged around the central axis, and the second inclined wall is located at a side of the annular protrusion near the entrance.

12. The quick connection structure according to claim 5, wherein the unlocking portion comprises a third inclined wall, and the second locking portion comprises a fourth inclined wall, the third inclined wall is located between the fourth inclined wall and the entrance, and the third inclined wall and is located at an outer side of the fourth inclined wall along the radial direction.

13. The quick connection structure according to claim 5, wherein the locking component is configured to rotate relative to the mounting portion about the central axis, an inner circumferential surface of the locking component comprises an arc-shaped wall arranged around the central axis, and a radial distance between the arc-shaped wall and the central axis increases gradually along a circumferential direction.

14. The quick connection structure according to claim 13, wherein an end of the first locking portion away from the central axis is arc shaped.

15. The quick connection structure according to claim 13, wherein a first limit portion and a second limit portion are respectively formed at two ends of the arc-shaped wall along the circumferential direction to abut the first locking portion.

16. The quick connection structure according to claim 13, wherein an arc-shaped groove is defined in the locking component surrounding the central axis, and the first reset component is arranged in the arc-shaped groove with one end thereof connected to the mounting portion and the other end thereof connected to the locking component.

17. The quick connection structure according to claim 16, wherein the first mounting hole comprises a first hole portion and a second hole portion at an inner side of the first hole portion, a cross section of the second hole portion is less than that of the first hole portion, and a step is formed at a junction of the second hole portion and the first hole portion; and wherein the first locking portion comprises a contact part facing to the step, and the second reset component is arranged between the contact part and the step with one end thereof connected to the step and the other end thereof connected to the contact part.

18. The quick connection structure according to claim 16, wherein the arc-shaped groove is located between the entrance of the mounting groove and the arc-shaped wall along the axial direction.

19. The quick connection structure according to claim 13, wherein the second mounting hole extends through the annular wall and communicates with the mounting groove, one end of the second locking portion is connected to the unlocking portion and the other end extends through the second mounting hole to the outside along a direction perpendicular to the central axis, an end of the locking component away from the entrance of the mounting groove defines a limiting groove, and the limiting groove extends through the inner circumferential surface and communicates with the second mounting hole along a direction perpendicular to the central axis.

20. The quick connection structure according to claim 19, wherein the second component further comprises an annular flange supporting the locking component thereon, the annular flange is located at a bottom side of the locking component and extends beyond the annular wall along the radial direction, and the second mounting hole extends into the annular flange.

\* \* \* \* \*